United States Patent
Park et al.

(10) Patent No.: US 10,330,055 B2
(45) Date of Patent: Jun. 25, 2019

(54) ENGINE COOLING SYSTEM HAVING EGR COOLER

(71) Applicants: HYUNDAI MOTOR COMPANY, Seoul (KR); KIA MOTORS CORPORATION, Seoul (KR)

(72) Inventors: Cheol Soo Park, Suwon-si (KR); Dong Suk Chae, Seoul (KR); Philgi Lee, Suwon-si (KR); Jun Sik Park, Seoul (KR); Jeawoong Yi, Uiwang-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 15/832,698

(22) Filed: Dec. 5, 2017

(65) Prior Publication Data

US 2019/0120178 A1    Apr. 25, 2019

(30) Foreign Application Priority Data

Oct. 24, 2017  (KR) .................. 10-2017-0138367

(51) Int. Cl.
| | | |
|---|---|---|
| *F02M 26/33* | (2016.01) | |
| *F01P 5/10* | (2006.01) | |
| *F02M 26/28* | (2016.01) | |
| *F02D 41/00* | (2006.01) | |

(52) U.S. Cl.
CPC ............. *F02M 26/33* (2016.02); *F01P 5/10* (2013.01); *F02D 41/0077* (2013.01); *F02M 26/28* (2016.02); *F01P 2025/32* (2013.01); *F01P 2025/50* (2013.01); *F02D 2200/101* (2013.01); *F02D 2200/1002* (2013.01)

(58) Field of Classification Search
CPC ...... F01P 3/02; F01P 7/165; F01P 3/20; F01P 3/12; F01P 3/207; F02F 1/10
See application file for complete search history.

(56) References Cited

U.S. PATENT DOCUMENTS

| | | | |
|---|---|---|---|
| 2013/0213324 A1* | 8/2013 | Saitoh ............... | F01P 7/165 123/41.09 |
| 2013/0213600 A1* | 8/2013 | Saitoh ............... | F01P 7/165 165/11.1 |
| 2014/0130753 A1* | 5/2014 | Koyama ............ | F01P 7/167 123/41.05 |
| 2015/0176472 A1* | 6/2015 | Hutchins .......... | F01P 7/16 701/102 |

(Continued)

FOREIGN PATENT DOCUMENTS

KR        10-1720568 B1     3/2017

*Primary Examiner* — Long T Tran
(74) *Attorney, Agent, or Firm* — Knobbe Martens Olson & Bear LLP

(57) ABSTRACT

An engine cooling system having an EGR cooler is disclosed. The system includes a cylinder head provided on a cylinder block, a coolant pump that pumps a coolant to a coolant inlet side of the cylinder block, an EGR cooler that is branched from a coolant line between the coolant pump and the cylinder block, and is provided in a circulation line through which a coolant is recirculated to an inlet of the coolant pump, and a coolant control valve unit that is provided in a coolant output side of the cylinder head to receive a coolant exhausted from the cylinder head and a coolant exhausted from the cylinder block and controls coolants distributed to coolant parts.

12 Claims, 4 Drawing Sheets

(56) References Cited

U.S. PATENT DOCUMENTS

| | | | |
|---|---|---|---|
| 2015/0176477 A1* | 6/2015 | Park, II | F01P 3/02 60/599 |
| 2015/0377114 A1* | 12/2015 | Matsumoto | F02F 1/14 123/41.44 |
| 2017/0058753 A1* | 3/2017 | Lee | F01P 7/14 |
| 2017/0074154 A1* | 3/2017 | Kaneko | F01P 11/18 |
| 2017/0145896 A1* | 5/2017 | Lee | F01P 7/16 |
| 2017/0370272 A1* | 12/2017 | Koguchi | F01P 3/02 |

* cited by examiner

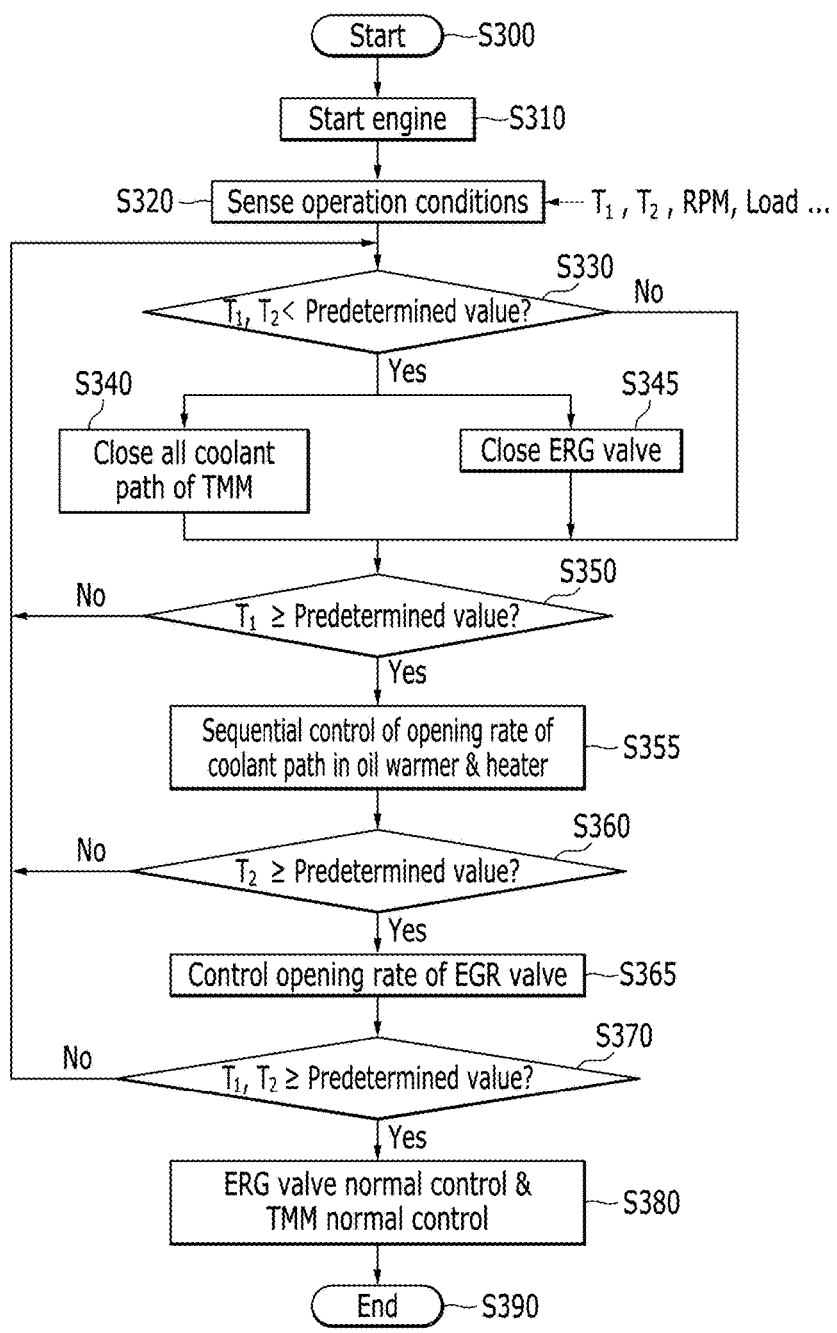

ENGINE COOLING SYSTEM HAVING EGR COOLER

CROSS-REFERENCE TO RELATED APPLICATION

This application claims priority to and the benefit of Korean Patent Application No. 10-2017-0138367 filed in the Korean Intellectual Property Office on Oct. 24, 2017, the entire contents of which are incorporated herein by reference.

BACKGROUND (a) Field

The present disclosure relates to an engine cooling system having an exhaust gas recirculation (EGR) cooler that can decrease a combustion temperature of a combustion chamber by recirculating exhaust gas to an inlet side from an exhaust side and can reduce a nitride oxide.

(b) Description of Related Art

An engine generates torque from combustion of fuel, and discharges exhaust gas. Particularly, an engine coolant absorbs heat energy while circulating the engine and emits the absorbed heat to the outside through a radiator.

When a coolant temperature of the engine is low, viscosity of oil is increased, thereby causing increase of a friction force, increase of fuel consumption, increase of activation time of a catalyst, and deterioration of exhaust gas quality.

When the coolant temperature of the engine is excessively high, knocking occurs and then ignition timing needs to be controlled to suppress the occurrence of knocking, thereby causing deterioration of performance. In addition, when a temperature of lubricant is excessively high, lubrication performance may be deteriorated.

The above information disclosed in this Background section is only for enhancement of understanding of the background of the invention. Applicant notes that this section may contain information available before this application. However, by providing this section, Applicant does not admit that any information contained in this section constitutes prior art.

SUMMARY

A method for controlling temperatures of several cooling parts through a single valve unit can be applied to maintain a specific portion of the engine at a high temperature and other portion at a low temperature.

Such a coolant control valve unit controls coolants that circulate an engine (an oil cooler, a heater, an EGR cooler, and the like) and a radiator respectively to thereby improve the entire cooling efficiency of the engine and reduce fuel consumption.

Thus, a coolant temperature at a predetermined location is sensed by using a coolant temperature sensor, a target coolant temperature is set based on operation conditions, and the coolant control valve unit is controlled according to the target coolant temperature.

In particular, a method in which coolant temperature sensors that sense coolant temperatures at an inlet side and an outlet side of the engine are disposed to control the coolant control valve unit according to the coolant temperatures sensed by the coolant temperature sensors may be used.

In addition, exhaust gas is recirculated to the inlet side to reduce a nitride oxide included in the exhaust gas, and an EGR cooler is used to cool recirculated exhaust gas (i.e., EGR gas). A coolant may be circulated to the EGR cooler.

Meanwhile, a method for optimizing an alignment of the EGR cooler, stably cooling the EGR gas, shortening time taken to warm up a coolant that circulates the EGR cooler by controlling the coolant, and reducing condensate water generated from the EGR cooler has been researched and developed.

The present disclosure has been made in an effort to provide an engine cooling system having an EGR cooler, which can optimize an alignment of the EGR cooler, stably cool the EGR gas, shorten time taken to warm up a coolant that circulates the EGR cooler by controlling the coolant, and reduce condensate water generated from the EGR cooler.

An engine cooling system having an EGR cooler according to an embodiment of the present invention includes: a cylinder head provided on a cylinder block; a coolant pump that pumps a coolant to a coolant inlet side of the cylinder block; an EGR cooler that is branched from a coolant line between the coolant pump and the cylinder block, and is provided in a circulation line through which a coolant is recirculated to an inlet of the coolant pump; and a coolant control valve unit that is provided in a coolant output side of the cylinder head to receive a coolant exhausted from the cylinder head and a coolant exhausted from the cylinder block and controls coolants distributed to coolant parts.

The engine parts may include a heater core, an oil warmer, or a radiator.

The engine cooling system may further include a first coolant temperature sensor that senses a temperature of a coolant exhausted from the cylinder head and a second coolant temperature sensor that senses a temperature of a coolant exhausted from the coolant pump.

The engine cooling system may further include an EGR valve that controls an exhaust gas that circulates the EGR cooler.

The engine cooling system may further include a ECU that senses a temperature of a coolant from the first and second coolant temperature sensors and controls the coolant control valve unit and the EGR valve based on operation conditions.

The ECU may sense the operation conditions and block all coolant paths of the coolant control valve unit and the EGR valve when a temperature of a coolant sensed by the first and second coolant temperature sensors is lower than a first predetermined value, and may control a flow amount of a coolant that passes through at least one of the coolant parts by using the coolant control valve unit when the coolant temperature sensed by the first and second coolant temperature sensors is higher than a second predetermined valve.

The ECU may control a coolant supplied to the oil warmer among the coolant parts by controlling the coolant control valve unit.

When controlling the coolant supplied to the oil warmer, the ECU may control a coolant supplied to the oil warmer first by controlling the coolant control valve unit and then may control a coolant supplied to the heater core.

The ECU may control an opening amount of the EGR valve when a coolant temperature sensed by the second coolant temperature sensor is higher than a third predetermined value.

The operation conditions may include a rotation per minute (RPM) of an engine, a load (fuel injection amount), an outside temperature, or a coolant temperature.

According to embodiments of the present invention, the ERG cooler is disposed in the outlet side of the coolant pump so that a coolant is always circulated to the EGR cooler, thereby simultaneously improving stability and durability.

In addition, when a temperature of the coolant is higher than a predetermined value, recirculated exhaust gas is set to be passed through the EGR cooler to recover heat from exhaust gas and shorten time taken to warm up a coolant.

Further, a coolant path through which a coolant is supplied to the oil warmer is opened first, and then a coolant path through which a coolant is supplied to the heater while the coolant is warmed up to a predetermined temperature so that a temperature of the engine oil and a temperature of the coolant can be increased promptly, thereby effectively reducing fuel consumption of the engine.

BRIEF DESCRIPTION OF THE DRAWINGS

FIG. 4 is a flowchart that shows a control method of a ECU in the engine cooling system according to an embodiment of the present invention.

DESCRIPTION OF SYMBOLS

Figure 1:
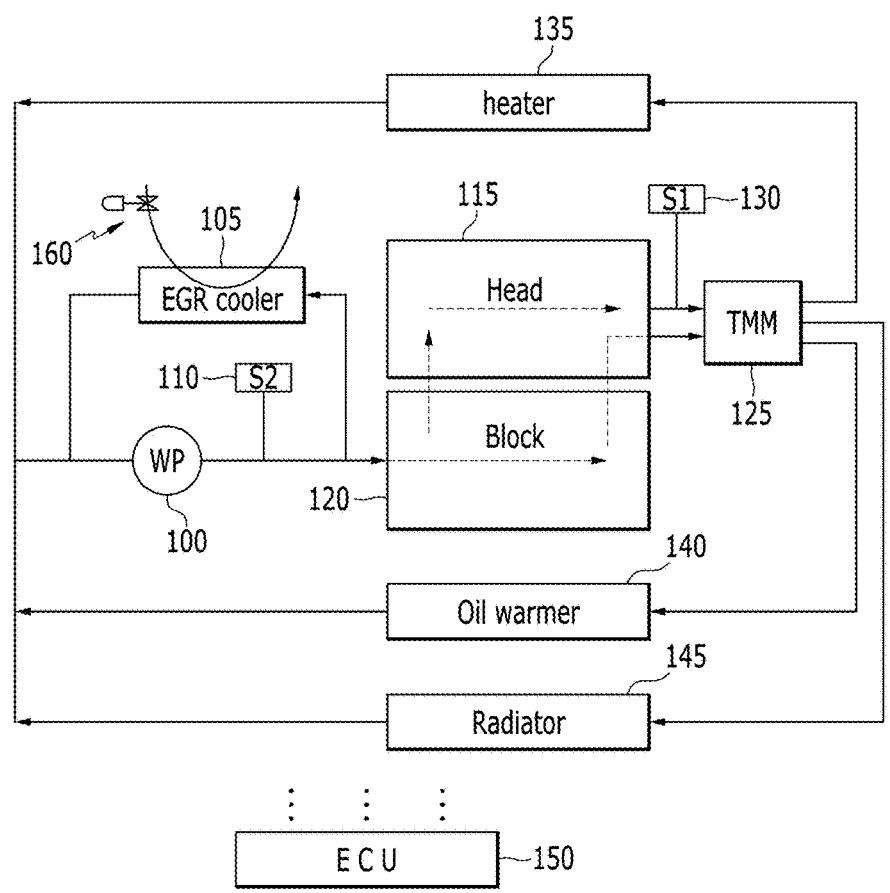
FIG. 1 is a schematic diagram of an engine cooling system having an EGR cooler according to an embodiment of the present invention.

100: coolant pump
105: EGR cooler
110: second coolant temperature sensor
115: cylinder head
120: cylinder block
130: first coolant temperature sensor
135: heater
140: oil warmer
145: radiator
150: ECU
160: EGR valve
T1: first coolant temperature
T2: second coolant temperature
125: coolant control valve unit (TMM: thermal management module)

DETAILED DESCRIPTION

Hereinafter, embodiments of the present invention will be described in detail with reference to the accompanying drawings.

However, since sizes and thicknesses of elements are shown at will for convenience of description, the present invention is not limited to the drawings without fail, but the thicknesses are enlarged for clearly expressing different parts and regions.

The drawings and description are to be regarded as illustrative in nature and not restrictive, and like reference numerals designate like elements throughout the specification.

In the following description, dividing names of components into first, second, and the like is to divide the names because the names of the components are the same, and an order thereof is not particularly limited.

An aspect of the present invention provide a method for controlling an engine cooling system for a hybrid vehicle. At least one controller 150 controls the coolant valve 125 for controlling flow rates of coolant through oil warmer 140, radiator 145 and heater 150. At least one controller 150 controls the control valve 125 using a first coolant temperature (T1) measured using sensor S1 (downstream cylinder head 115 of a combustion engine) and/or a second coolant temperature (T2) measured using sensor S2 (upstream cylinder block 120 of the engine). In embodiments, the second coolant temperature T2 is higher than the first coolant temperature T1 due to heat from the engine.

In embodiments, subsequent to a starting of the engine, before the first coolant temperature T1 reaches a first reference (temperature for release flow stop in FIG. 3), the controller controls the valve 125 to prevent coolant flow to any of oil warmer 140, radiator 145 and heater 150. Then, when the first coolant temperature T1 reaches the first reference, the controller controls the valve 125 to circulate coolant through the oil warmer 140 (Mode 2) first while coolant from the engine is not supplied to the radiator 145 and heater 150 such that temperature of the oil reaches to a desirable temperature (target temperature, FIG. 3) than when coolant is circulated the radiator 145 or heater 150 as well.

In embodiments, at the starting of the engine, the controller EGR valve 160 is closed. Even after the first coolant temperature T1 reaches the first reference temperature (temperature for release flow stop in FIG. 3), the controller keep EGR valve 160 closed until the first coolant temperature T1 reaches a second reference temperature higher than the first reference temperature. In embodiment, Referring to FIG. 2, in the early warming-up stage (before the first coolant temperature T1 reaches the second reference temperature), the controller operates to (1) supply no coolant to oil warmer 140, radiator 145 or heater 150 (the first section), then (2) to supply coolant to oil warmer 140 only, and then (3) to supply coolant to oil warmer 140 and another device (radiator 145 or heater 150).

FIG. 1 is a schematic diagram of an engine cooling system having an EGR cooler according to an embodiment of the present invention.

Referring to FIG. 1, an engine cooling system may include a coolant pump 100, an EGR cooler 105, a first coolant temperature sensor 130, a second coolant temperature sensor 110, a cylinder head 115, a cylinder block 120, a coolant control valve unit 125, a heater 135, an oil warmer 140, a radiator 145, an engine control unit (ECU) 150, and an EGR valve 160.

The coolant pump 100 pumps a coolant to a coolant inlet side of the cylinder block 120, and then the pumped coolant may pass the cylinder head 115 and the cylinder block 120.

The coolant control valve unit 125 may be also called a thermal management module (TMM), and is disposed at a coolant outlet side of the cylinder head 115 and controls a coolant exhausted from the cylinder head 115 or the cylinder block 120.

In addition, the coolant control valve unit 125 may control coolants distributed to the heater 135, the oil warmer 140, and the radiator 145, respectively.

The first coolant temperature sensor 130 may sense a temperature of a coolant exhausted from the cylinder head 115, and the second coolant temperature sensor 110 may sense a temperature of a coolant exhausted from the coolant pump 100 and then supplied to the cylinder block 120.

A circulation line is formed to the intake side of the coolant pump 100 by being branched from a coolant line between the coolant pump 100 and the cylinder block 120, and thus the EGR cooler 105 is disposed in the circulation line.

In addition, a recirculation line through which the exhaust gas is recirculated is connected to the EGR cooler 105, and the EGR valve 160 is disposed in the recirculation line.

In embodiments of the present invention, when the coolant pump 100 operates, the coolant is always circulated to the EGR cooler 105, and when the EGR valve 160 is opened, an exhaust gas exhausted from the outlet side of the engine is recirculated to the inlet side and then cooled by the EGR cooler 105.

The ECU 150 controls the EGR valve 160 and the coolant control valve unit 125 according to first and second coolant temperatures T1 and T2 sensed by the first and second coolant sensors 130 and 110 and operation conditions of the engine. Here, the operation conditions of the engine may include an outside temperature, a revolution per minute (RPM) of the engine, and a load (or a fuel injection amount).

In addition, the heater 135 and the oil warmer 140 are provided on different coolant circuits, and the coolant control valve unit 125 controls flows of the coolant flowing through the heater 135 and the oil warmer 140, respectively. Further, the coolant control valve unit 125 optimizes open timing of the EGR valve 160 to reduce fuel consumption, and the EGR cooler 105 recovers exhaust heat to shorten a warm-up time.

An operation timing of the EGR cooler 105 may be controlled by opening the EGR valve 160, and the EGR valve 160 operates when an outside temperature is about 0 to 15 degrees or more and when a coolant temperature circulating the EGR cooler 105 is 60 degrees or more.

Here, a coolant temperature difference between a front end and a rear end of the EGR cooler 105 is a maximum of 6 to 7 degrees, and the EGR valve 160 may be closed in a heating priority area of which an outside temperature is below −15 degrees. When the EGR valve 160 starts to operate, a coolant needs to be circulated to the EGR cooler 105 in order to prevent a boiling phenomenon from occurring.

When the coolant starts to flow, the temperature of the coolant supplied to the EGR cooler 105 is increased, and when a flow rate is reduced to 30% from the maximum, a temperature difference between the inlet and the outlet is increased to about 18 degrees to about 21 degrees.

In addition, as an outlet temperature of the coolant is increased, the flow rate of the coolant that circulates the EGR cooler 105 is increased and at the same time, the warm-up time can be shortened, and in this case, heat emission amount data of the EGR cooler 105 can be used.

In embodiments of the present invention, the ECU 150 may be implemented by one or more micro-processors operated by a predetermined program, and the predetermined program may include a series of commands for performing a method according to an embodiment of the present invention to be described below.

Figure 2:
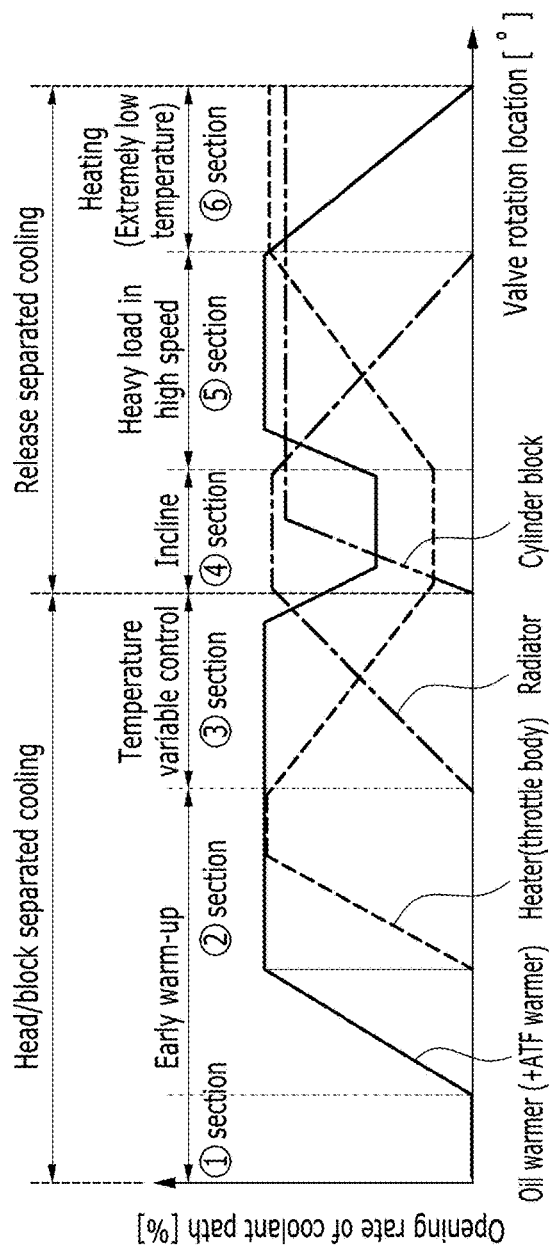
FIG. 2 is a graph that shows a control mode of a coolant control valve unit in the engine cooling system according to an embodiment of the present invention.

FIG. 2 is a graph that shows a control mode of the coolant control valve unit in the engine cooling system according to an embodiment of the present invention.

Referring to FIG. 2, the horizontal axis denotes a rotation location of a rotary valve embedded in the coolant control valve unit 125, and the vertical axis denotes an opening rate of a coolant path formed in the rotary valve.

In embodiments of the present invention, referring to a disclosed structure of the coolant control valve unit 125, a coolant flowing through the oil warmer 140, the heater 135, the radiator 145, the cylinder block 120, or the cylinder head 115 may be individually controlled.

In the head/block separated cooling condition, a coolant flowing through the cylinder block 120 and a coolant flowing through the cylinder head 115 are separately controlled, and in the separated cooling release condition, the coolant is controlled to simultaneously flow through the cylinder block 120 and the cylinder head 115.

A first section is a flow stop section, and in this section, all coolant paths in the coolant control valve unit 125 are closed and the EGR valve 160 is closed.

During a second section, a coolant supplied to the oil warmer 140 is controlled first and then a coolant supplied to the heater 135 is controlled.

Here, the oil warmer 140 serves to warm up engine oil, and when the coolant is supplied to the oil warmer 140, transmission oil flowing through an auto transmission fluid (ATF) warmer can be warmed up. In addition, the heater 135 serves to heat up indoor air of the vehicle, and when the coolant is supplied to the heater 135, a throttle body is also heated up.

During a third section, coolants supplied to the heater 135 and the radiator 145 are controlled, and during a fourth section, coolants flowing through the cylinder block 120, the oil warmer 140, and the heater 135 are controlled.

In addition, during a fifth section, coolants flowing through the oil warmer 140, the heater 135, and the radiator 145 are controlled, and during a sixth section, a coolant flowing through the oil warmer 140 is controlled and the coolants flowing through the heater 135 and the cylinder block 120 are controlled to the maximum.

Figure 3:
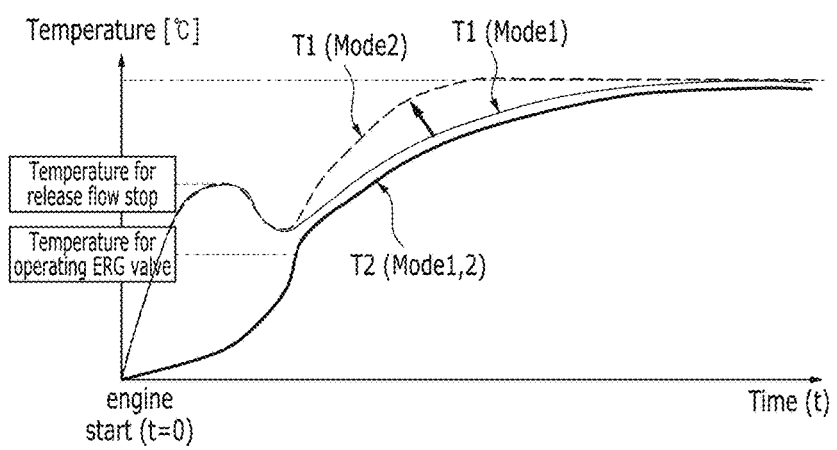
FIG. 3 is a graph that shows a coolant temperature on time in the engine cooling system according to an embodiment of the present invention.
Figure 3:
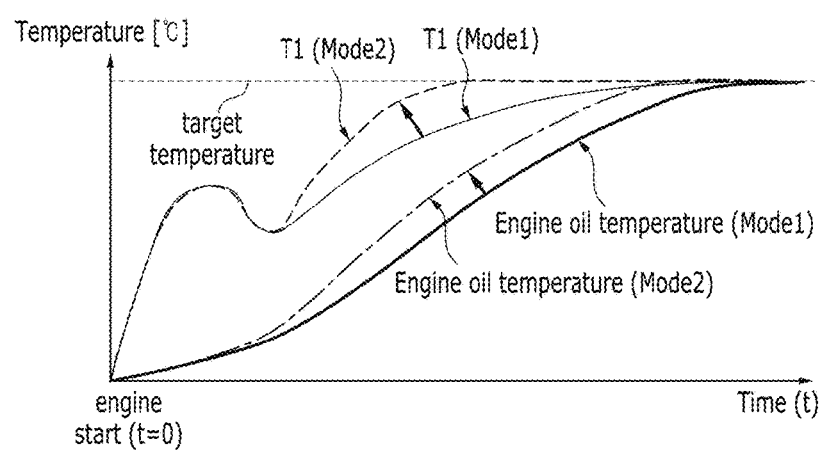

FIG. 3 is a graph that shows a coolant temperature on time according to embodiments of the present invention.

Referring to the upper graph of FIG. 3, the horizontal axis denotes time and the vertical axis denotes a coolant temperature.

T1 (mode 1) denotes a first coolant temperature sensed by the first coolant temperature sensor 130 in a first mode, and T1 (mode 2) denotes a first coolant temperature sensed by the first coolant temperature sensor 130 in a second mode.

In addition, T2 (mode 1,2) denotes a second coolant temperature T2 sensed by the second coolant temperature sensor 110 in the first and second modes, and the second coolant temperature T2 may be determined as a temperature of a coolant supplied to the EGR cooler 105.

With reference to a coolant temperature, an operation temperature and a temperature for releasing flow stop are set, and when the second coolant temperature T2 reaches the operation temperature of the EGR valve 160, the EGR valve 160 starts to open, and when the first coolant temperature T1 reaches the flow stop release temperature, a coolant flows through the cylinder block 120 or the cylinder head 115.

In the first mode, a coolant is supplied to the heater 135 from a timing at which coolant flow stop is released in the cylinder block 120. In addition, in the second mode, a coolant is supplied to the oil warmer 140 first from a timing at which coolant flow stop is released in the cylinder block 120, and then the heater 135 is supplied with a coolant. As shown in the drawing, the first coolant temperature T1 is warmed up faster in the second mode.

Referring to the lower graph of FIG. 3, the horizontal axis denotes time and the vertical axis denotes an engine oil temperature.

Since the first coolant temperature T1 is the same as in the upper graph, engine oil temperatures (mode 1 and mode 2) will be described.

An engine oil temperature (mode 1) denotes a temperature of engine oil in the first mode, and an engine oil temperature (mode 2) denotes a temperature of the engine oil in the second mode.

FIG. 4 is a flowchart that shows a control method of the ECU in the engine cooling system according to embodiments of the present invention.

Referring to FIG. 4, in S300, control starts, the engine starts in S310, and then the ECU 150 senses operation conditions in S320. Here, the operation conditions may include the first coolant temperature T1, the second coolant temperature T2, a rotation per minute (RPM), and a load/fuel injection amount.

In S330, the ECU 150 senses the first coolant temperature T1 and the second coolant temperature T2 sensed by from the first and second coolant temperature sensors 130 and 110, and determines whether the sensed temperatures are lower than predetermined values. When the first and second coolant temperatures T1 and T2 are lower than predetermined value, the steps S340 and S345 are performed, and when the first and second coolant temperatures T1 and T2 are higher than the predetermined values, the step S350 is performed.

In S340, the ECU 150 closes all the coolant paths of the coolant control valve unit 125, and in S345, the ECU 150 closes the EGR valve 160.

In S350, the ECU 150 determines whether first coolant temperature T1 is higher than the predetermined value, and when the first coolant temperature T1 is lower than the predetermined value, step S355 is performed, and when the first coolant temperature T1 is lower than the predetermined value, the step S330 is performed again.

In S355, the ECU 150 controls the coolant control valve unit 125 to sequentially control an opening rate of the coolant paths that correspond to the oil warmer 140 and the heater 135.

In embodiments of the present invention, in S355, the ECU 150 opens the coolant path of the oil warmer 140 first to warm up the coolant by minutely controlling an opening rate thereof. In addition, the ECU 150 opens the coolant path of the heater 135 and minutely controls an opening rate thereof.

In S360, the ECU 150 determines whether the second coolant temperature T2 is lower than the predetermined value, and when the second coolant temperature T2 is lower than the predetermined value, the step S330 is performed, and when the second coolant temperature T2 is lower than the predetermined value, step S365 is performed.

In the step S365, the ECU 150 opens the EGR valve 160 and controls an opening rate thereof. In S370, the ECU 150 determines whether the first coolant temperature T1 and the second coolant temperature T2 are higher than the predetermined value, and when the first and second coolant temperatures T1 and T2 are higher than the predetermined value, step S380 is performed, and when the first and second coolant temperatures T1 and T2 are lower than the predetermined value, the step S330 is performed.

In S380, the ECU 150 normally controls the EGR valve 160 in a predetermined mode, and normally controls the coolant control valve unit 125 in a predetermined mode.

In embodiments of the present invention, the step S340 and the step S345 may be performed in the first section of FIG. 2, and the step S380 may be performed in the third to sixth sections of FIG. 2.

As described above, a coolant is always circulated to the EGR cooler 105, and recirculated exhaust gas is set to be passed through the EGR cooler 105 when a temperature of the coolant is higher than the predetermined value to thereby recover heat from the exhaust gas and shorten time taken for warming up the coolant.

Further, a coolant path through which a coolant is supplied to the oil warmer 140 is opened first, and then a coolant through which a coolant is supplied to the heater 135 while the coolant is warmed up to a predetermined level is opened such that a temperature of the engine oil and the temperature of the coolant can be increased promptly, thereby effectively reducing fuel consumption of the engine.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

While this invention has been described in connection with certain embodiments, it is to be understood that the invention is not limited to the disclosed embodiments. On the contrary, it is intended to cover various modifications and equivalent arrangements included within the spirit and scope of the appended claims.

What is claimed is:

1. An engine cooling system provided with an exhaust gas recirculation (EGR) cooler, comprising:
   a cylinder block;
   a cylinder head provided over the cylinder block;
   a coolant pump configured to pump coolant to a coolant inlet of the cylinder block;
   an EGR cooler in fluid communication with the coolant pump;
   a first coolant temperature sensor configured to sense a first temperature of coolant discharged from the cylinder head;
   a second coolant temperature sensor configured to sense a second temperature of coolant flowing from the coolant pump to the cylinder block; and
   a coolant control valve unit that is provided downstream a coolant outlet of the cylinder head, wherein the coolant control valve unit is configured to receive coolant from the cylinder head,
   wherein the coolant control valve unit is configured to control a coolant flow to at least one part based on the first temperature and the second temperature.

2. The engine cooling system of claim 1, wherein the at least one part comprise a heater core, an oil warmer, or a radiator.

3. The engine cooling system of claim 2, further comprising:
   an EGR valve configured to control exhaust gas that circulates the EGR cooler; and
   an engine control unit (ECU) configured to control the coolant control valve unit and the EGR valve based on operation conditions.

4. The engine cooling system of claim 3, wherein the ECU is configured to block all coolant paths of the coolant control valve unit and the EGR valve when the first and second temperatures are lower than a first predetermined value, and further configured to control a flow amount of coolant that passes through the at least one part through the coolant control valve unit when the first temperature is higher than a second predetermined value.

5. The engine cooling system of claim 4, wherein the at least one part comprises an oil warmer and a heater core, wherein the ECU is configured to control the coolant control valve unit such that coolant is supplied to the oil warmer first, and then supplied to the heater core.

6. The engine cooling system of claim 1, further comprising an EGR valve configured to control flow of exhaust gas that circulates the EGR cooler.

7. The engine cooling system of claim 6, further comprising an engine control unit (ECU) configured to control the coolant control valve unit and the EGR valve based on operation conditions.

8. The engine cooling system of claim 7, wherein the ECU is configured to block all coolant paths of the coolant control valve unit and the EGR valve when the first and second temperatures are lower than a first predetermined value, and further configured to control a flow amount of coolant that passes through the at least one part by using the coolant control valve unit when the first temperature is higher than a second predetermined value.

9. The engine cooling system of claim 8, wherein the at least one part comprises an oil warmer, wherein the ECU is configured to control the coolant control valve unit to control a flow of coolant supplied to the oil warmer.

10. The engine cooling system of claim 8, wherein the at least one part comprises an oil warmer and a heater core, wherein when controlling the coolant supplied to the oil warmer, the ECU is configured to control the coolant control valve unit such that coolant is supplied to the oil warmer first, and then supplied to the heater core.

11. The engine cooling system of claim 8, wherein the ECU is configured to control an opening amount of the EGR valve when the second temperature is higher than a third predetermined value.

12. The engine cooling system of claim 7, wherein the operation conditions comprise a rotation per minute (RPM) of an engine, a load (fuel injection amount), an outside temperature, or a coolant temperature.

* * * * *